April 18, 1950  D. W. LONGFELLOW  2,504,854
ROTARY COMBUSTION CHAMBER
Filed March 9, 1945  3 Sheets-Sheet 1
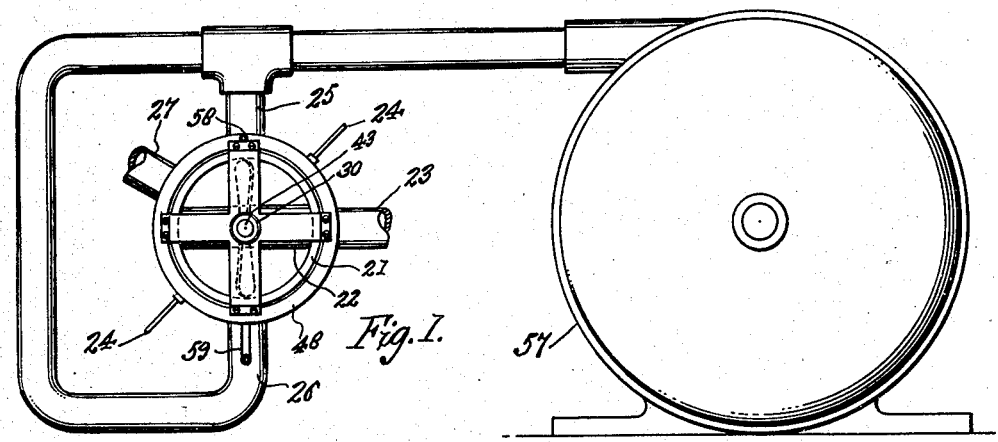
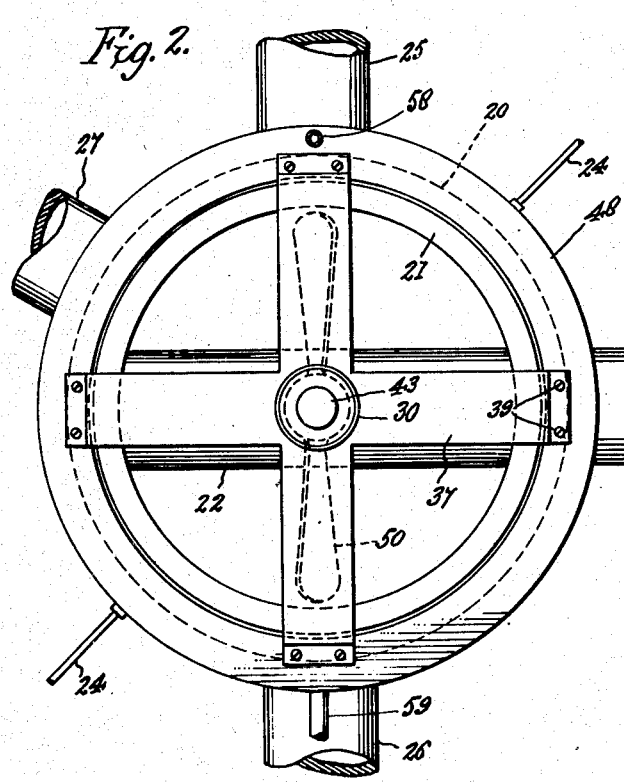
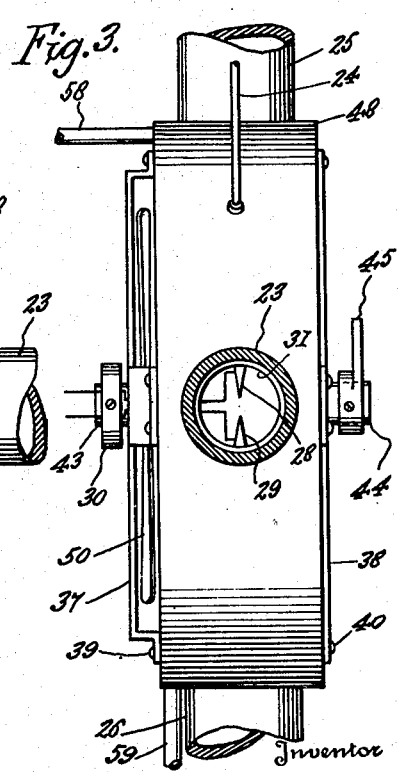
Inventor
D. W. Longfellow
By Wilkinson & Mawhinney
Attorneys

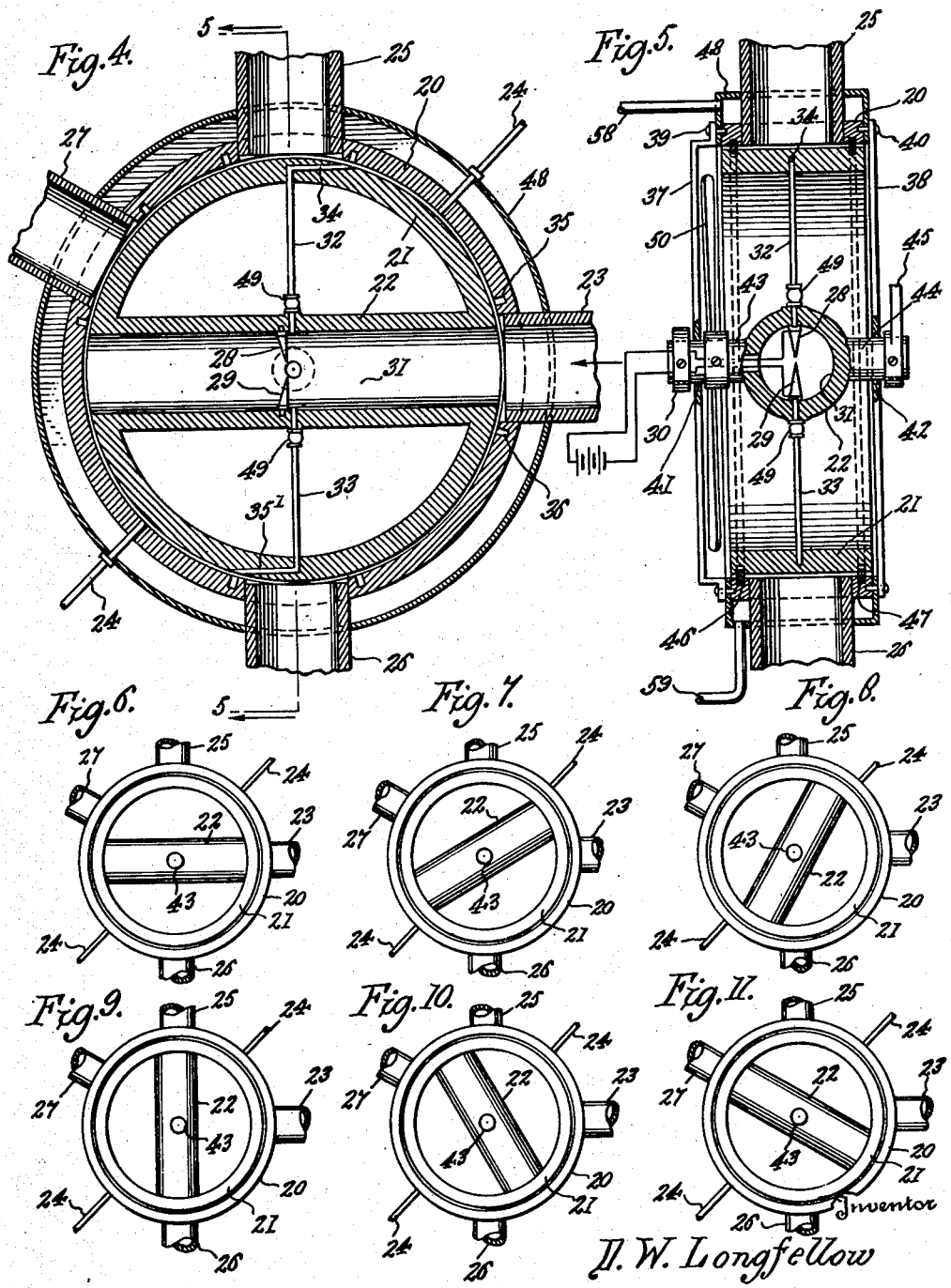

Inventor
D. W. Longfellow
By Wilkinson & Mawhinney
Attorneys

Patented Apr. 18, 1950

2,504,854

UNITED STATES PATENT OFFICE 2,504,854

ROTARY COMBUSTION CHAMBER

Dwight W. Longfellow, Golden Beach, Fla.

Application March 9, 1945, Serial No. 581,905

7 Claims. (Cl. 60—44)

The present invention relates to improvements in rotary combustion chamber, and has for an object to provide such a device for producing burned gases under high pressure useful for a variety of purposes, for instance for the operation of gas turbine engines and directly in propelling any character of device or vehicle by what is commonly called jet propulsion.

Another object of the invention is to provide a compact, simply-operating device for receiving a mixture of combustible gas and air as supporting oxygen with ignition means to ignite the combustible mixture in timed relation to its movements between the intake and exhaust.

A further object of the invention resides in providing an internal combustion device of the character above stated in which provision is made for cooling to avoid high temperature and also for heating locally where differential expansion might result in a drop of efficiency.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a side elevation of an improved internal combustion device constructed in accordance with the present invention and shown as connected to a turbine.

Figure 2 is a side elevation, taken on an enlarged scale of the improved internal combustion device with parts of the exhaust pipes broken away.

Figure 3 is a front elevation of the device with the air intake pipe and high pressure exhaust pipes partly shown in section.

Figure 4 is a vertical section taken through the improved internal combustion device.

Figure 5 is a cross section taken on the line 5—5 of Figure 4.

Figures 6 through 11 are diagrammatic views of the device showing the successive phase positions to clearly indicate mode of operation.

Figure 12:
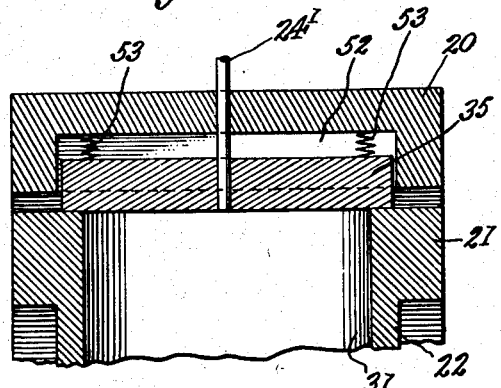
Figure 12 is a transverse section through the casing and rotor at one of the fuel supply nozzles.

Referring more particularly to the drawings 20 designates a casing or shell of a circular form adapted to receive therein a rotor composed of a rim 21 and a diametric cylinder 22 constituting a combustion chamber having both ends freely open through the rim of the rotor.

An air intake pipe 23 enters through the casing 20 at a position approximately midway of the height of the casing and forwardly with respect to the direction in which the vehicle, for instance the airplane, on which the device is mounted, is moving. Fuel nozzles 24 enter through the casing 20 at suitable points angularly displaced from the air intake 23. In this instance there are two fuel nozzles 24 located at diametrically opposite points with the proximate fuel nozzle angularly offset from the axis of the intake pipe 23 by an angle of approximately forty-five degrees, the axis of the air inlet pipe 23 coinciding with the horizontal.

Displaced angularly approximately ninety degrees in both directions from the air intake pipe 23 are the high pressure exhaust pipes 25 and 26 which are diametrically in line with their coincident axes vertical. Actually the machine does not need two exhaust pipes. Either could be closed and the exhaust all removed by way of the other. A low pressure exhaust pipe 27 also enters through the stationary casing 20 or stator and is counterclockwise disposed from the upper high pressure exhaust pipe 25 by an angle of approximately sixty degrees.

Spark plugs 28 and 29 are coupled in a suitable ignition circuit with a commutator or timer 30 of a customary form driven by the rotor for closing the circuit across the plugs cyclically as hereinafter described.

From the combustion chamber 31 pipes 32 and 33 lead in opposite directions and communicate with right angularly disposed jet discharge passages or nozzles 34 and 35' in the rim 21, such passages opening at their other ends through the periphery of said rim 21. The direction of the issuing jets of highly expanded combustible mixture are so directed as shown in Figure 4, as to drive the rotor in a counterclockwise direction.

The casing 20 is provided with pairs of sealing devices 35 and 36, one on each side of the pipes 23, 25, 26 and 27 and also on opposite sides of the fuel nozzles 24 if desired.

Referring more particularly to Figure 5 it will be apparent that both the casing 20 and the rotor rim 21 are of ring form and open at opposite sides. Cruciform frames 37 and 38 are affixed, as by the fastenings 39 and 40, to the side edges of the ring casing or shell 20 and have bearings 41 and 42 at their central portions in which the trunnions 43 and 44 of the rotor are journaled, these trunnions extending out from opposite sides of the cylinder 22. The timer or commutator 30 is shown as affixed upon one trunnion 43 and a cam 45 affixed to the other trunnion 44 in position to operate the tappets or valves controlling the fuel intake nozzles 24, if such control is desired.

Still referring to Figure 5, pairs of annular sealing rings or gates 46 and 47 are carried between the casing 20 and rotor rim 21 as hereinafter more fully described.

A sheet metal or other heating casing 48 envelope the shell or stator 20 with appropriate openings therein for the passage of the pipes 23, 25, 26 and 27 and for the passsage of the fuel nozzles 24, the casing being affixed to the stator as by the use of the same fastenings 39, 40 used to couple the frames 37 and 38 to the stator 20.

Check valves 49 may if desired be mounted in the pipes 32 and 33 and fan blades in any number may be mounted within the rim 21 to cause a rapid circulation of cooling air through such rim and over the cylinder 22; or an appropriate fan 50 affixed to the trunnion 43 may serve this purpose.

Referring more particularly to Figure 12 a form of sealing gate 35 is shown being mounted in a groove 52 of the casing 20. The fuel supply nozzles 24' fit through the shell 20 with a tight sleeve slidable fit and they are tight in the sealing gates 35.

Figure 13:
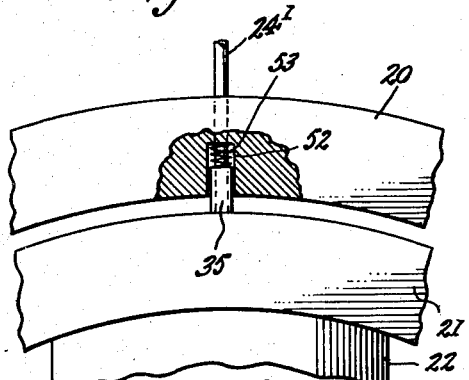
Figure 13 is a fragmentary side view of the casing and rotor showing one of the spring-pressed sealing gates.

Referring more particularly to Figure 13 the casing 20 is shown as having transverse grooves 52 therein for slidably receiving sealing gates 35. One or more coil springs 53 seated in the bases of the grooves 52 constantly urge the sealing gates 35 against the periphery of the rotor 21.

Referring more particularly to Figures 14 to 17 inclusive, an annular sealing gate 46 is shown as mounted in grooves 55 and 56 respectively of the stator 20 and rotor 21. The description of the operation of these parts will follow.

The operation of the device is generally as follows referring to Figures 6–11.

Figure 6 shows the rotor in the starting position with the chamber or cylinder 31 full of atmospheric air to which it has free access through the pipe 23 which opens to the atmosphere in the direction of movement of the airplane. The left end of the combustion chamber 31 is closed by the casing so that if the device is traveling through the air from left to right at high speed and high atmospheric pressure the air in the combustion chamber 31 is under high pressure; and this is the normal condition after flight is started.

In Figure 7 the rotor has rotated counterclockwise thirty degrees, in which position both ends of the combustion chamber 31 are closed by the casing 20, and the position is such that the leading edges of the open mouths of the combustion chamber 31 are just approaching communication with the intake fuel nozzles 24. The fuel nozzles being continuously open to a source of fuel under pressure, or the cam 45 being timed to open the fuel intake valves at this position of the combustion chamber 31, the combustion chamber 31 will continue to receive the fuel charge from diametrically opposite sources concurrently and throughout the time interval that the two opposite mouths of the combustion chamber 31 are rotating past the port areas of the fuel nozzles 24. In other words fuel is sprayed under pressure into the combustion chamber 31 from both ends. Where fuel valves are used, such valves are kept open preferably until the cylinder has been rotated slightly under thirty degrees, thus spraying fuel across practically the full diameter of the combustion chamber 31.

In Figure 8 the rotor has been rotated counterclockwise an additional thirty degrees (total sixty degrees) to a position where both ends or mouths of the combustion chamber 31 are still closed by the casing and just a short distance beyond the fuel jets 24. At this instant the spark timing device 30 starts the spark or sparks to jump the spark gaps 28, 29. The circuit will be kept closed until the rotor position shown in Figure 10 is almost reached, whereupon the spark is discontinued. These sparks continued for this relatively long period of time insure complete combustion of all combustible fuel in the chamber 31. As soon as rotation goes beyond the point shown in Figure 8, the leading edges of the opposed mouths of the combustion chamber 31 begin to communicate with the high pressure exhaust pipes 25 and 26 and the rapidly combusting and expanding gases rush out.

In Figure 9 the rotor is shown as having been rotated an additional thirty degrees which causes the combustion chamber 31 to line up perfectly with the two exhaust vents 25, 26. The pressure in the combustion chamber thereupon rapidly becomes the same as that in the exhaust tubes. This pressure is dependent on the restriction in the vent. If the restrictions are great a relatively small amount of the burned gases pass out into the vent and the pressure in the combustion chamber 31 and the vent remain high. With few restrictions the pressure in both becomes relatively low and a large proportion of the burned gases pass out of the cylinder into the vent.

As shown in Figure 10, the rotor has been rotated an additional thirty degrees and the combustion chamber 31 has again become closed at both ends by the casing. The chamber 31 is now full of burnt gases and the pressure in the chamber 31 is the same as that in the top and bottom exhaust tubes or vents 25, 26.

In Figure 11 the rotor is shown as rotated another additional thirty degrees and is now exactly aligned with the low pressure exhaust vent 27. The burnt gases have been allowed to escape from the chamber 31 so that the pressure in the chamber 31 is the same as that in the low pressure exhaust vent 27. If the vent 27 leads directly to the outside air, the pressure in the chamber 31 will be reduced down to approximately atmospheric pressure.

In traveling the next thirty degrees which brings the rotor back to the original position shown in Figure 6, the opening into the low pressure exhaust vent 27 is closed and at the same time the intake opening 23 on the right opens until it is the full diameter of the chamber 31. If the low pressure vent or tube 27 is long enough and is not restricted, the momentum of the burnt gases passing out the length of the tube will tend to create a low pressure in the chamber 31, but since the right hand end is now opening up to atmospheric pressure or greater on the right, the atmosphere on the right of the device is drawn into the chamber 31, passing on through to the low pressure exhaust 27 as long as it can. When the original horizontal position of Figure 6 is again reached, the pressure in the chamber 31 is at least equal to atmospheric pressure and may be more due to the stopping of the momentum of the gases as they were rushing through or due to the additional pressure caused by motion of the device through the air if it has motion as a jet propelled machine. When the chamber 31 has reached the original horizontal position, as shown in Figure 6, it is ready to repeat the cycle although a rotation of only 180° has been accomplished and the chamber 31 is lying so that what was originally the right hand end is now the left hand end.

It will be appreciated that the device possesses to a high degree sturdiness and simplicity in both construction and mode of operation and it has many advantages over other types of machines designed to accomplish a similar purpose.

In Figure 1 the improved device is shown as coupled to drive the turbine 57 which creates sufficient back pressure in the high pressure exhaust pipes 25, 26 to create a differential between the pressure in these pipes and in the low pressure exhaust 27 which will usually be evacuated to atmosphere.

Fuel valves and fuel timing devices are not required if the rotor fits tight enough to the casing, in which case the rotor would keep the flow of fuel shut off until the chamber opening came and released the fuel.

Where the reaction device consisting of the passages 32, 33, 34, 35' are not used, a small engine, motor or turbine could be coupled to the rotor for rotating the same including the chamber 31. This would require only a small amount of power.

An induction pipe 58 and a recirculating pipe 59 are connected to the heating jacket or casing 48, to couple such heating jacket in a circuit with a source of heated fluid supply. The purpose of this heating jacket 48 is to heat the casing 20 so that it will expand in an amount more nearly equal to that of the rotor, thus tending to keep the clearance between the rotor and the casing the same regardless of the high temperature which the combustion cylinder 22 is certain to reach.

The sealing ring and sealing gate make it unnecessary to keep the clearance between the rotor and the casing as small as would be necessary if no sufficient sealing devices were used. In Figure 12 a method for supplying the liquid fuel through a sealing gate is shown. With this device the fuel is automatically fed at the proper time when the combustion chamber 31 is in the proper position without any other timing device.

The fan blades attached to the rotor draw air through the device and keep the cylinder temperature down as low as necessary for proper operation. The jet arrangement 34, 35' requires the device to rotate under its own power. These are preferably very small jets since the power required is very small. The gas under pressure is taken from the center of the cylinder 22 and its combustion chamber 31 and such gas moves rapidly out the pipes 32, 33 to the rim 21 and then turns at right angles into the jet passages 34, 35'.

The check valves 49 are for the purpose of permitting the gas to move radially outward through the tubes 32, 33 but preventing any back flow into the combustion chamber 31. This is important when the jets 34, 35' pass the high pressure exhaust openings. The gas emerges from the jets 34, 35' in a direction parallel to the axis of the cylinder 22. The openings of the jets are arranged at such points that one of them is starting to open into the low pressure exhaust vent 27 at the instant an explosion takes place. This continues through a rotation of approximately thirty degrees until the cylinder 22 is in the vertical position; at which time the chamber 31 is fully open to exhaust into the high pressure exhaust outlets 25, 26. At this instant the other jet begins to open into the intake opening 23 on the right. It is true that this opens against the substantially high pressure which exists at this point if the device is used on a jet-propelled plane traveling to the right at high speed; but that pressure would necessarily be much less than that of the escaping gas. The volume of gas escaping is small and if the intake pipe or tube 23 at the right is short, the gas is blown out in a substantially complete manner before air is drawn into the device. Even though some of the gas remains it would be the first to enter the cylinder and should be all drawn through and out the low pressure exhaust opening before the cylinder is closed to the intake.

Figure 14:
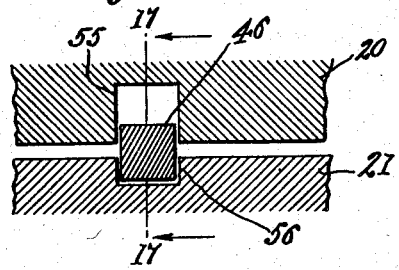
Figure 14 is a cross section through the casing and rotor and through a sealing gate or ring taken on the line 14—14 in Figure 17, and showing the ring or gate in the operating position.
Figure 15:
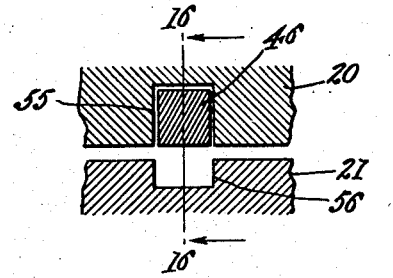
Figure 15 is a similar cross section taken on the line 15—15 in Figure 16, and showing the position of the sealing gate when installing the rotor.
Figure 16:
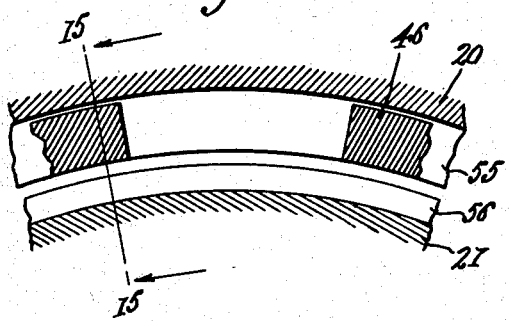
Figure 16 is a longitudinal fragmentary section through the casing and rotor and a sealing gate taken on the line 16—16 of Figure 15.
Figure 17:
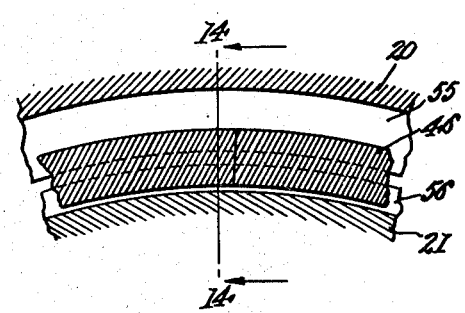
Figure 17 is a similar section taken on the line 17—17 of Figure 14.

The sealing rings should be made of spring steel and so made that it has to be sprung apart at the ends (Figure 16) to expand it into the casing groove 55. It must be then held apart (Figure 15) until the rotor groove 56 is opposite it, when it is allowed to spring together and into such groove 56 (Figure 14). The small diameter which is required to get the ring into the casing originally is obtained by lapping the two ends by pulling one end within the other like a volute or spiral.

The frames 37 and 38 keep the rotor centered properly.

The couple shown in Figure 1 may replace the usual turbine and compressor in a much more efficient, satisfactory and economical manner.

While the diametric and cylindrical form of the chamber 31 is probably simplest and most efficient it will be understood that other longitudinal and cross-sectional forms may be employed.

Although for convenience in illustration and description I have disclosed the device as mounted about a horizontal axis and as rotating in a vertical plane, it will be clear that the axis might be vertical and the plane of rotation horizontal, in which case all of the peripheral ports would be in a horizontal plane. The mode of operation, however, would be the same.

In a similar way the vertical section of Figure 4 and the diagrams Figures 6-11 inclusive are all taken from one side of the device in which the rotor is viewed as having an anti-clockwise rotation. It will be understood, however, that the rotor may rotate in a clockwise direction and in fact it does so when viewed from the opposite side of the device. By an appropriate and obvious rearrangement of the exhaust and inlet ports the rotor might rotate clockwise in Figure 4.

Both vents 25 and 26 may be completely restricted or eliminated causing and compelling all of the exhaust gases to escape through vent 27. In some cases a series of puffs, such as would come out of 27 might be just as satisfactory for the main source of power as the more uniform high pressure which would be obtained from 25 and 26.

It is obvious that various changes and modifications may be made in the details of construction and design of the above specifically described embodiment of this invention without departing from the spirit thereof such changes and modifications being restricted only by the scope of the following claims.

What is claimed is:

1. An internal combustion device comprising a stator having an air outlet, a fuel inlet angularly displaced from the air inlet, a high pressure exhaust angularly displaced from the fuel intake, and a low pressure exhaust angularly offset from said high pressure exhaust, a rotor having a single combustion chamber across its diameter with ends opening through the periphery of the rotor and adapted in sequence during rotation to communicate with said air and fuel intakes and with said high and lower pressure exhausts, means to rotate said rotor, a spark gap in said combustion chamber, and means for energizing said spark gap twice during each rotation of the rotor covering an arcuate span included by the interval when either mouth of the combustion chamber has passed the fuel intake until after it has passed the high pressure exhaust.

2. An internal combustion device comprising a rotor, means to rotate said rotor, said rotor having a diametric combustion chamber therethrough opening upon opposite sides of the rotor, a stator receiving said rotor and having an air intake adapted to supply said combustion chamber with air through its opposite open ends twice during each rotation of the rotor, diametrically opposed high pressure exhausts angularly displaced from the air intake and adapted to simultaneously register with opposite open ends of the combustion chamber of said rotor, a low pressure exhaust angularly displaced from the high pressure exhausts, diametrically opposite fuel intakes one between said air intake and high pressure exhaust, a spark gap in said combustion chamber, and means for energizing said gap promptly after the open ends of the combustion chamber have rotated past the fuel intakes.

3. An internal combustion device comprising a rotor having a combustion chamber therein extending substantially diametrically across the rotor and having open mouths through the periphery of the rotor, a stator having a forward substantially horizontal air intake adapted to communicate in succession with both mouths of the combustion chamber at each successive rotation of the rotor, substantially vertical diametrically opposed high pressure exhausts adapted to simultaneously communicate with both mouths of the combustion chamber twice during each rotation of the rotor, a single low pressure exhaust angularly displaced from the diametric vertical line of the high pressure exhausts and being located to the side of such vertical line opposite the air intake but being offset from the horizontal line of the air intake sufficiently to permit communication between the air intake and low pressure exhausts twice during the rotation of the rotor but only through a port area which is less than the diameter of the chamber, a fuel intake approximately forty-five degrees above the air intake, a second fuel intake diametrically opposite the first fuel intake, means for rotating the rotor counterclockwise, a spark gap in said combustion chamber, and means for energizing said gap promptly after the mouths of the chamber pass the fuel inlets.

4. An internal combustion device comprising complemental rotor and stator, said rotor having a combustion chamber, means to ignite the charge in the chamber, means to rotate the rotor, said stator having the following inlet and exhaust ports angularly offset from one another in the relation of the rotation of said rotor; an air intake, a fuel intake approximately forty-five degrees from the air intake, a high pressure exhaust approximately ninety degrees from the air intake, and a lower pressure exhaust approximately one hundred and fifty degrees displaced from the air intake.

5. An internal combustion device comprising a stator and rotor unit, a single combustion chamber across the diameter of said rotor, an air inlet and exhaust outlets entering said stator, fuel supply lines diametrically opposed entering said stator between said air inlet and exhaust outlets, means to ignite the charge in said combustion chamber, fan blades carried by said rotor in the spaces on each side of said diametric combustion chamber so constructed and arranged as to create a draft of air to cool the exterior of said combustion chamber and sealing gates arranged between said rotor and stator at opposite sides of said air inlet and exhaust outlets.

6. A device according to claim 5 in which the opposed faces of the stator and rotor are provided with registering grooves running annularly around the circle of these members and near the outer edges of the same, a contractile spring packing ring in connection with each pair of grooves of a cross-sectional size to fit completely when expanded into the stator groove to permit assembly of the rotor to the stator by a relative axial movement, said rotor groove being shallower than the depth of the packing ring to hold the ring when contracted crosswise of the joint between rotor and stator.

7. A device as claimed in claim 5 in which pipes extend from the chamber to the outer part of the rotor and there terminate in jet nozzles for directing the products of combustion substantially tangential to the perimeter of the rotor.

DWIGHT W. LONGFELLOW.

REFERENCES CITED

The following references are of record in the file of this patent:

UNITED STATES PATENTS

| Number | Name | Date |
|---|---|---|
| 1,083,943 | Raclot | Jan. 13, 1914 |
| 1,291,273 | Tyler | Jan. 14, 1919 |
| 1,983,191 | Price | Dec. 4, 1934 |

FOREIGN PATENTS

| Number | Country | Date |
|---|---|---|
| 15,770 | Great Britain | July 5, 1912 |
| 692,951 | France | Aug. 11, 1930 |